United States Patent [19]

Morishima et al.

[11] Patent Number: 4,719,524
[45] Date of Patent: Jan. 12, 1988

[54] SIGNAL REPRODUCTION APPARATUS INCLUDING TOUCHED STATE PATTERN RECOGNITION SPEED CONTROL

[75] Inventors: Shinichi Morishima; Syousuke Tanaka, both of Kanagawa; Takahide Ohtani, Tokyo, all of Japan

[73] Assignee: Sony Corporation, Tokyo, Japan

[21] Appl. No.: 784,752

[22] Filed: Oct. 7, 1985

[30] Foreign Application Priority Data

Oct. 8, 1984 [JP] Japan .................................. 59-211035
Mar. 30, 1985 [JP] Japan .................................. 60-47970

[51] Int. Cl.$^4$ ............................................ G11B 15/46
[52] U.S. Cl. ........................................ 360/73; 369/50; 360/69
[58] Field of Search ............................ 360/73, 137, 69; 242/201, 206, 208; 200/DIG. 1, DIG. 34; 369/50

[56] References Cited

U.S. PATENT DOCUMENTS

| | | |
|---|---|---|
| 4,290,052 | 9/1981 | Eichelberger et al. ..... 200/DIG. 1 X |
| 4,411,008 | 10/1983 | D'Alayer de Ustemore d'Arc .................................. 360/137 X |
| 4,413,252 | 11/1983 | Tyler et al. ................ 200/DIG. 1 X |
| 4,503,471 | 3/1985 | Harajima et al. ................ 360/137 X |
| 4,595,913 | 6/1986 | Aubuchon ................ 200/DIG. 1 X |

Primary Examiner—Aristotelis M. Psitos
Attorney, Agent, or Firm—Lewis H. Eslinger; Alvin Sinderbrand

[57] ABSTRACT

A signal reproduction apparatus is disclosed, which simply permits control operations in operation control modes absorutely corresponding to detection regions of the touch panel and also various controls, e.g., speed control and feed control or the like corresponding to changes of the touch operation state of the touch panel with the lapse of time. The apparatus thus improves the operation control property of a multi-function VTR including JOG mode functions or the like.

7 Claims, 28 Drawing Figures

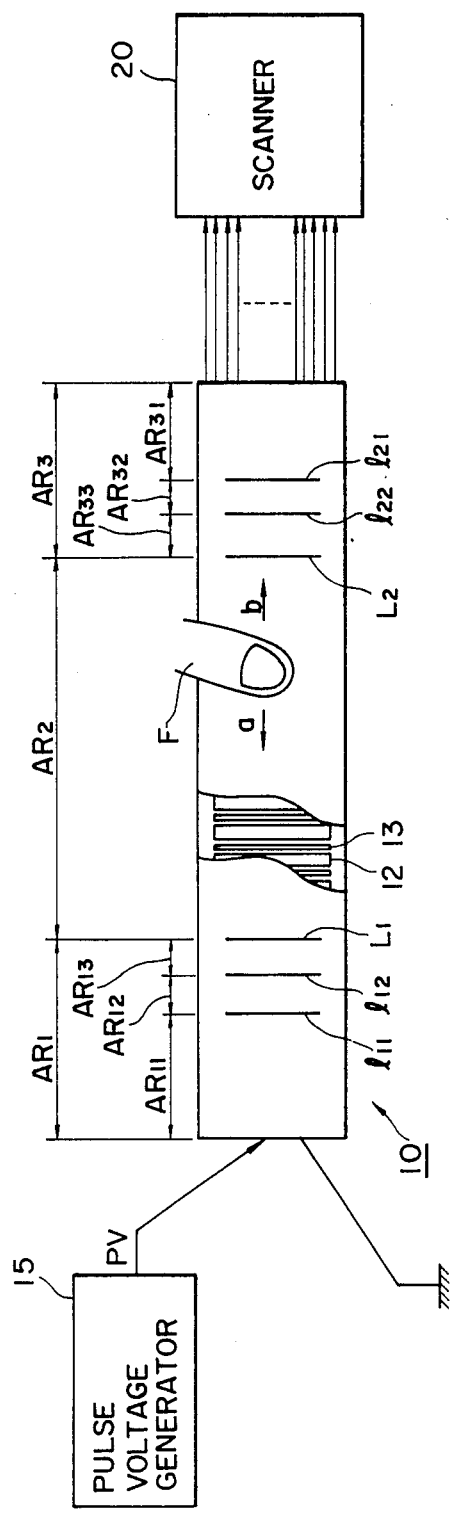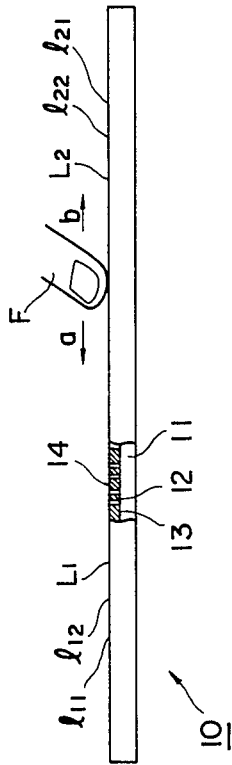

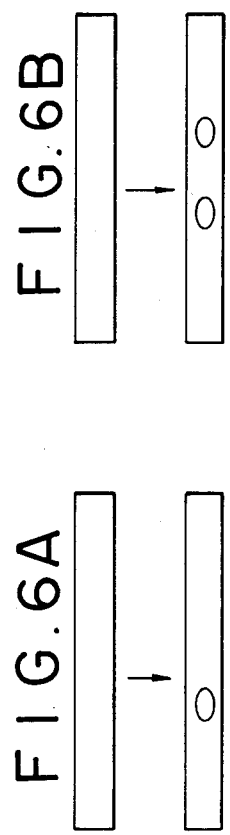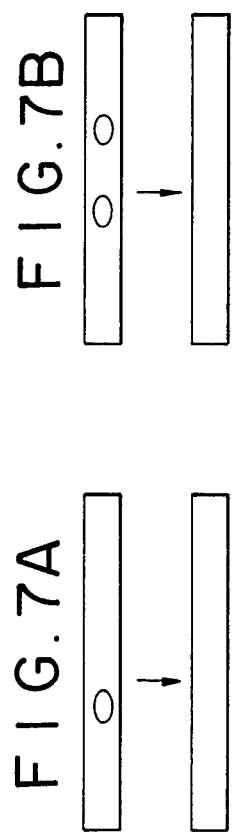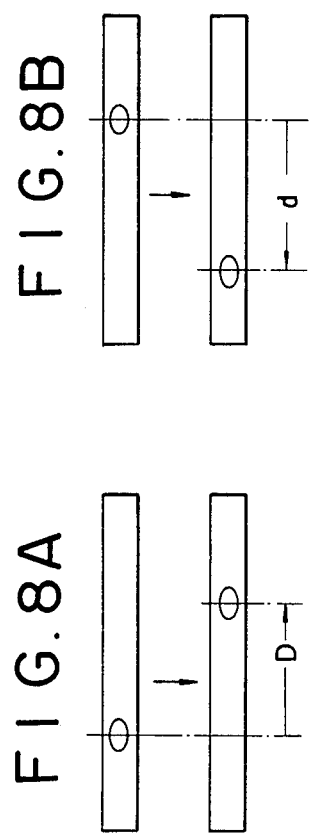

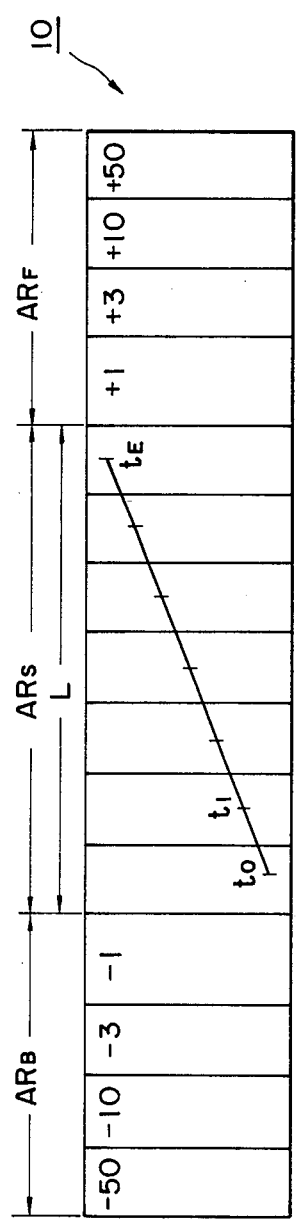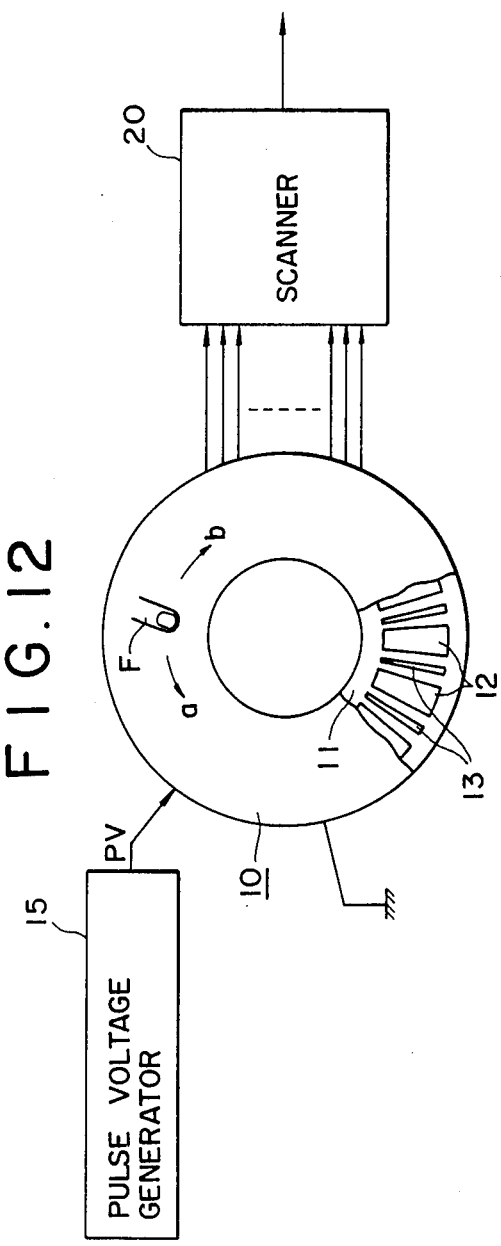
FIG. 11
FIG. 12

SIGNAL REPRODUCTION APPARATUS INCLUDING TOUCHED STATE PATTERN RECOGNITION SPEED CONTROL

BACKGROUND OF THE INVENTION

1. Field of the Invention:

This invention relates to a signal reproduction apparatus for reproducing a video signal or an audio signal from a recording medium and, more particularly to, a signal reproduction apparatus of the type noted above which may be applied to a video tape recorder, an audio disk player or the like.

2. Description of the Prior Art:

Prior art video tape recorders include those, which have various special reproducing functions such as reverse reproduction or variable speed reproduction as well as ordinary recording and reproducing functions.

Various operation modes are set and switched using key switches or touch switches. Further, rotary dials are utilized for so-called JOG mode operation during variable speed reproduction.

SUMMARY OF THE INVENTION

If a large number of different functions are not to be realized with a video tape recorder, the means and operation for providing control data for the control of these operations are inevitably complicated.

The present invention has been intended in the light of the above problems, and it seeks to provide a novel structure, with which the control of various functions such as the JOG mode operation of the video tape recorder can be simply realized.

According to the present invention, there is provided a signal reproduction apparatus for reproducing a video signal or an audio signal from a recording medium with data reading means, which comprises a panel having a plurality of detection regions, touch detection means for detecting the touched state of each of the detection regions, first memory means for temporarily storing detection output data obtained from the touch detection means, recognition means for recognizing touched states of the panel as respective patterns, second memory means for temporarily storing pattern data obtained by the recognition means, data comparison means for comparing pattern data representing the prevailing touched state obtained from the recognition means and pattern data representing the preceding touched state obtained from the second memory means and detecting a change in the pattern data, control data generating means for providing preset control data according to the output data of the data comparison means, and drive control means for controlling the relative speeds of the data reading means and recording medium such as to reproduce signal from the recording medium.

With the signal reproduction apparatus according to the present invention, the touched state of the touch panel is recognized by pattern recognition, and various mode control operations are brought about according to changes in the recognition pattern.

As has been described in the foregoing, with the signal reproduction apparatus according to the present invention it is possible to simply permit control operations in operation control modes absolutely corresponding to detection regions of the touch panel and also various controls, e.g., speed control and feed control or the like corresponding to changes of the touch operation state of the touch panel with the lapse of time.

Thus, the present invention can improve the operation control property of a multi-function VTR including JOG mode functions or the like.

The above-mentioned and other objects and features of the invention will become apparent from the following detailed description taken in conjunction with the drawings which indicate an embodiment of the invention.

BRIEF DESCRIPTION OF THE DRAWINGS

FIGS. 2A and 2B are respectively a front view, partly broken away, and a side view, partly broken away, showing a touch panel used for the embodiment of the present invention;

FIGS. 6A, 6B, 7A, 7B, 8A to 8C, 9A, 9B, 10A and 10B are views showing touch panel touch operation states for explaining the operation mode setting control of the same embodiment;

FIG. 11 is a schematic front view showing a touch panel in a modification of the embodiment in which the touch panel is allotted to different operation control modes; and FIG. 12 is a schematic view showing a modification of the touch panel.

DETAILED DESCRIPTION OF THE PREFERRED EMBODIMENT

Figure 1:
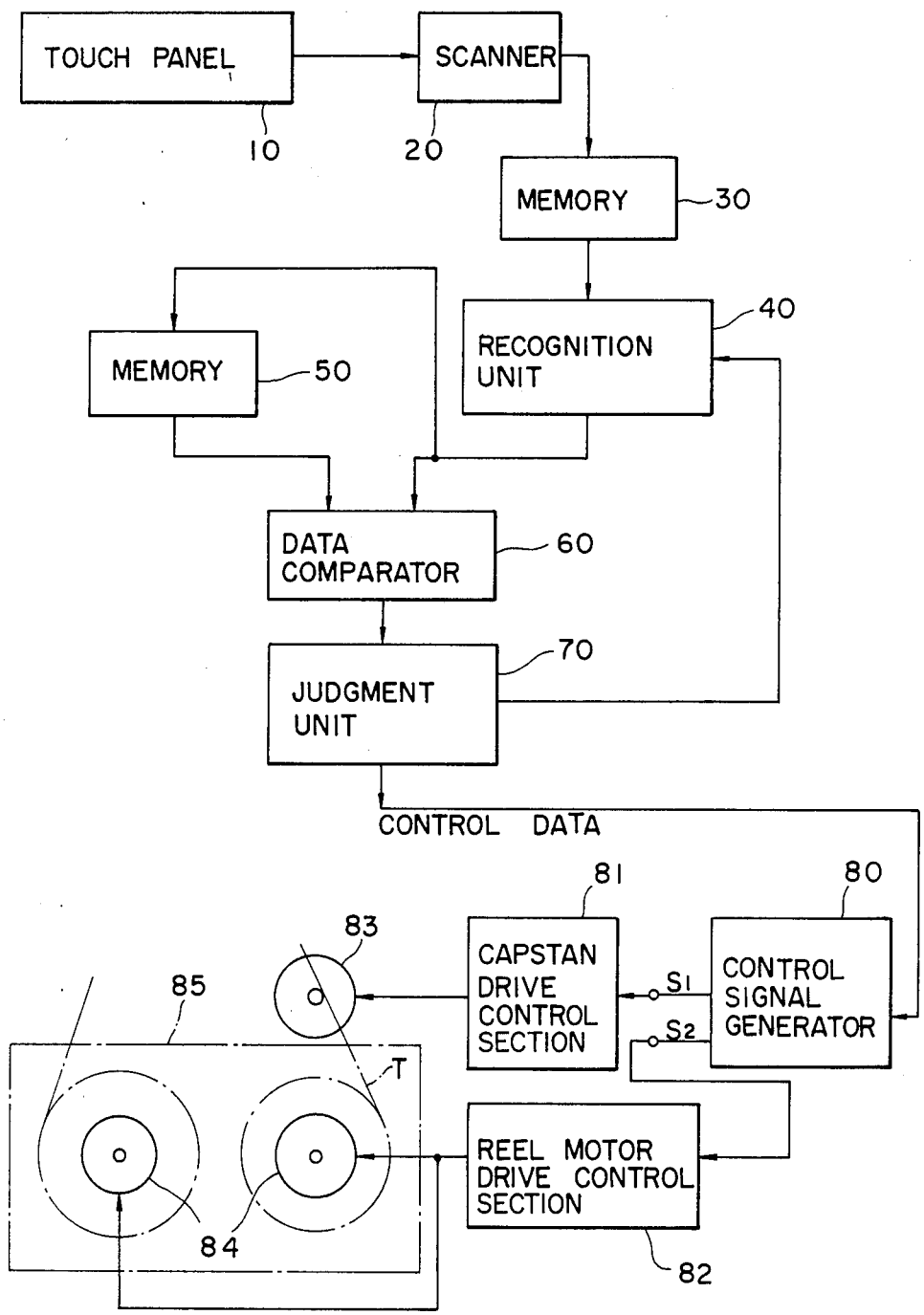
FIG. 1 is a schematic representation of the electric system of an embodiment of the present invention applied to a signal reproduction apparatus.

FIG. 1 is a block diagram showing the electric system of an embodiment of the present invention, and FIGS. 2A and 2B are respectively a schematic front view, partly broken away, and a side view, partly broken away, showing a touch panel 10 used in this embodiment.

In the embodiment, the touch panel 10 includes an insulating base 11, one surface of which is provided with an alternate arrangement of detection electrodes 12 and grounding electrodes 13, these electrodes being covered by an insulating cover film 14. The surface of the insulating cover film 14 has ridges L1 and L2 which serves as borderline dividing the touch panel 10 into first to third regions AR1 to AR3. The surface also has thinner ridges 111, 112, 131 and 132 which serve as borderline dividing the first and third regions AR1 and AR3 into sub-regions AR11 to AR13 and AR31 to AR33.

The operational principles underlying the touch panel 10 make use of the capacitance of a man. A change in the capacitance between the detection electrode 12 and the grounding electrode 13 is detected, the change being caused when the user touches the insulating cover film 14 with a finger. With this touch panel 10, the individual detection electrodes 12 are sequentially scanned by a scanner 20.

More specifically, a predetermined pulse voltage PV is supplied from a pulse voltage generator 15 to each of the detection electrodes 12 through a predetermined resistor (not shown). The grounding electrodes 13 are connected together. Each detection electrode 12 and one grounding electrode 13 adjacent thereto constitute a touch operation detection section. That is, a plurality of touch operation detection sections are arranged in a row on one surface of the insulating base 11. With respect to these touch operation sections, a touch operation surface is provided over the insulating cover film 14 such that is can be rubbed by a finger F in the direction of arrow a or b.

Figure 3A:
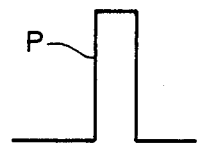
FIGS. 3A and 3B are waveform diagrams for explaining the operation of touching the touch panel of the same embodiment.
Figure 3B:

A predetermined electrostatic capacitance is formed between the detection electrode 12 and the grounding electrode 13 of each touch operation detection section. The predetermined pulse voltage PV that is supplied from the pulse voltage generator 15 to each detection electrode 12 through a predetermined resistor, has a waveform P as shown in FIG. 3A. If the touch operation surface is not touched by the finger F, a voltage $V_P$ as shown by a dashed line in FIG. 3B is obtained at each detection electrode 12 according to each pulse P due to charging and discharging operations caused according to the resistance of each resistor and the electrostatic capacitance between the detection electrode 12 and the grounding electrode 13 of each section. On the other hand, if the touch operation surface is touched by the finger F, it is equivalent to a situation that an electrostatic capacitance due to the presence of the finger F is connected between the detection electrode 12 and the grounding electrode 13 of each touch operation detection section at the position of the touch operation surface, at which the surface is touched by the finger F. In this case, the electrostatic capacitance between the detection electrode 12 the grounding electrode 13 noted above is thus increased. Thus, while the voltage Vp as shown by the dashed line in FIG. 3B is obtained at the detection electrode 12 of each touch operation detection section which is not at the position, at which the touch operation surface is touched by the finger F, according to each pulse P like the case when the touch operation surface is not touched by the finger F, at the detection electrode 12 of each touch operation detection section at a position, at which the touch operation surface is touched by the finger F, a voltage $V_Q$ as shown by a solid line in FIG. 3B is obtained according to each pulse P due to the charging and discharging operations caused according to the rsistance noted above and the increased electrostatic capacitance between the detection electrode 12 and the grounding electrode 13, the voltage $V_Q$ being lower than the voltage $V_P$ obtained at the detection electrode 12 of the touch operation detection section of the position, at which the touch operation surface is not touched by the finger F.

In the above way, the operation of touching the touch operation surface of the touch panel 10 is detected as a change in the voltage obtained at the detection electrode 12 constituting each touch operation detection section. Each of the touch operation detection sections provides an output VS corresponding to the voltage obtained at the detection electrode 12.

The detection electrodes 12 of the touch operation detection sections of the touch panel 10 are connected to the scanner 20. The scanner 20 sequentially scans the detection electrodes 12 of the individual touch operation detection sections with a detection electrode at a certain predetermined position as a reference point. The scanner 20 continuously repeats this scanning to sequentially and repeatedly provide the outputs VS of the individual touch operation detection sections. The outputs VS that are sequentially derived from the touch operation detection sections by the scanner 20, are fed to a memory 30. The outputs VS for one sanning cycle of the scanner 20 are sequentially stored in the memory 30.

The detection output data from one scanning cycle read out from the memory 30 is fed to a recognition unit 40. The recognition unit 40 recognizes the touch operation state of the touch panel 10 as a corresponding pattern for each scanning cycle of the scanner 20.

The pattern data obtained from the recognition unit 40 is fed to a second memory 50 and a data comparator 60. The second memory 50 stores the pattern data from the recognition unit 40 temporarily for one scanning cycle period of the scanner 10. The data comparator 60 compares the pattern data from the recognition unit 40 and the pattern data of the preceding scanning cycle read out from the second memory 50 and detects a change in the pattern data. The output of the data comparator 60 is fed to a judgement unit 70 for judging control data corresponding to the compared output data.

The judgement unit 70 reads out preset control data according to the touch operation state of the touch panel 10 and from a data table (not shown) according to the comparator output data and provides the read-out data.

The read-out control data is fed to a control signal generator 80. A tape T wound on a reel in a tape cassette 65 is controlled for running by a reel motor 84 and a capstan motor 83. The control signal generator 80 generates a capstan motor control signal S1 and a reel motor control signal S2 in correspondence to the control data. According to these signals a capstan motor drive control section 81 drives the capstan motor 83, while a reel motor drive control section 82 drives the reel motor 84, whereby a desired tape running is realized.

Figure 5A:
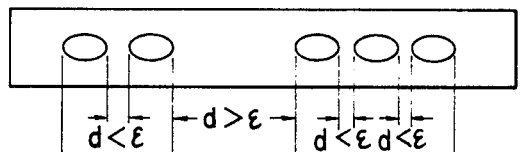
FIGS. 5A to 5C are views illustrating the procedure of pattern normalization of the recognition unit.
Figure 5B:
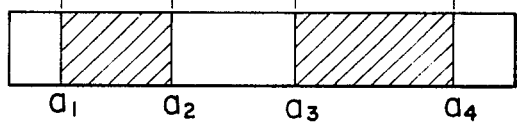

FIG. 4 schematically shows touch operation states of the touch panel 10 that can be recognized by the recognition unit 40. The recognizable states are one, in which the touch panel 10 is not touched at all as shown in FIG. 4A, one, in which the detection electrode 12 or a plurality of detection electrodes 12 constituting a detection region or detection regions are touched as shown in FIGS. 4B to 4D, one, in which two detection regions on the touch panel 10 are touched simultaneously as shown in FIGS. 4E and 4F, and one, in which three or more detection regions are touched simultaneously as shown in FIG. 4G. The judgement of the detection region may be done by making use of the interval of arrangement of the detection electrodes 12. Further, the recognition unit 40 detects a series of detection regions as shown in FIG. 5A on the basis of the interval ϵ noted above, converts the detected regions into block data as shown in FIG. 5B and produces a normalized pattern as shown in FIG. 5C through calculation of the center of each of the blocks shown in FIG. 5B.

Figure 5C:
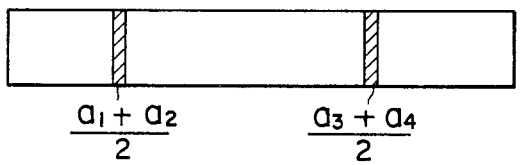

In this embodiment, when three or more normalized patterns as shown in FIG. 5C are produced, two patterns which are closest to one another are normalized to a single pattern, so that the recognition unit 40 produces two or less patterns at all time.

The touch panel type control data input device of this embodiment is applied to a video tape recorder (hereinafter referred to as VTR). The first to third regions AR1 to AR3 of the touch panel 10 are allotted as the following control data input regions.

The first and third regions AR1 and AR3 are for changed speed operation in the reverse and forward directions. When these regions ar touched, changed speed reproduction modes as shown in Table 1 are set irrespective of any previous mode of the VTR.

TABLE 1

| Touched region | | Set operation mode |
| --- | --- | --- |
| AR1 | AR11 | −50 times speed |
| | AR12 | −30 times speed |
| | AR13 | −10 times speed |
| AR3 | AR31 | +50 times speed |
| | AR32 | +30 times speed |
| | AR33 | +10 times speed |

The second regions AR2 is sued for JOG mode operations. When the user is touched with a finger or fingers substantially simultaneously and the finger or fingers are moved substantially at the same interval, the control of the operations will now be described with reference to the patterns shown in FIGS. 6A, 6B, 7A, 7B, 8A to 8C, 9A, 9B, 10A and 10B, these patterns being normalized patterns in the region AR2.

(1) When the region AR2 which has not been touched is touched at one position (FIG. 6A) or at two positions simultaneously, (FIG. 6B) with a finger or fingers, a still mode of the VTR is set.

(2) When a finger or fingers are released from the regions AR2 from at one position (FIG. 7A) or at two positions (FIG. 7B) (substantially simultaneously in case of the two fingers), the previous mode of the VTR is maintained. For example, when the finger is released to change the state of FIG. 6A to the state of FIG. 7A, the still mode is maintained.

(3) When a finger touching the region AR2 is moved to the right (FIG. 8A) or the left (FIG. 8B), the VTr performs the JOG mode operation at a speed corresponding to the direction and corved distance of the movement of the finger.

For example, when the finger is moved by a distance D to the right, the tape is fed in the forward direction at a speed corresponding to the distane D. In the case of FIG. 8B, the tape is fed in the reverse direction at a speed corresponding to the distance d. FIG. 8C shows when a finger is released from the panel after tracing the panel to the right. This means a combination of the casae of FIG. 7A after the case of FIG. 8A. It will be seen that the state of FIG. 8A is maintained after the finger is released.

Figure 9A:
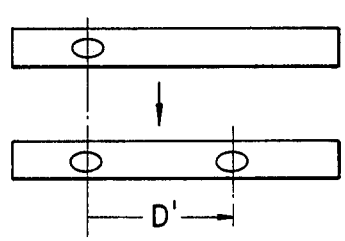
Figure 9B:
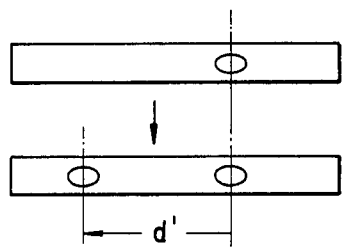

(4) FIG. 9A shows a case when the panel is touched at a position with a finger and simultaneously at a right side position with another finger. In this case, the tape is fed in the forward direction at a speed corresponding to the distance D'. In the case of Fig. 9B, the tape is fed in the reverse direction at a speed corresponding to the distance d'.

This operation takes place in case when putting two fingers on the panel and a finger corresponding to the direction, in which it is desired to feed the tape, is moved into the contact and away from the panel several times while moving the finger along the panel stepwise when the finger is touching the panel. When the finger is stopped, the still mode results.

Figure 10A:
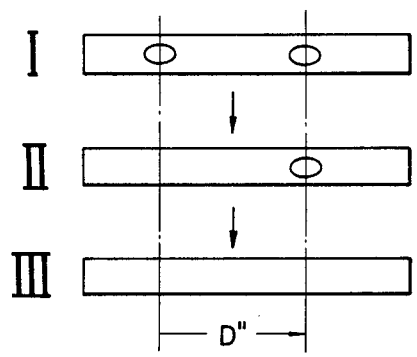
Figure 10B:
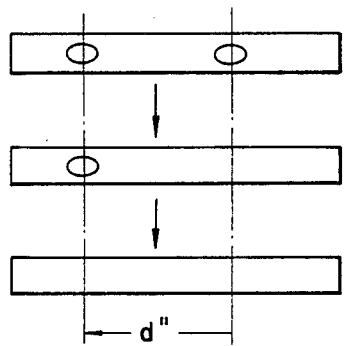

(5) In the case of FIG. 10A, two fingers are first put on the panel at different positions (I). Then the left side finger is released (II). Subsequently, the right side finger is released (III). More specifically, by putting two fingers on the panel at different positions and releasing the fingers with the finger corresponding to the direction, in which it is desired to feed the tape, lately, an equivalent situation sets in, in which the finger is moved to the right in FIG. 10A. Thus, a state, in which the tape is fed in the forward direction at a speed corresponding to the distance D'', is maintained. In the case of FIG. 10B, the tape is fed in the reverse direction by maintaining the speed corresponding to the distance d''.

In this case, the tape running mode is not changed at the instant of the change from the state (I) to the state (II). This change, however, is stored in the judgement unit 70, and the operation noted above takes place when and only when the state (II) is changed to the state (III).

Further, in the above embodiment, the normal reproduction mode of the VTR is set when the second and third regions AR2 and AR3 of the touch panel 10 are touched with two or more fingers or when these fingers are released from the panel substantially simultaneously from this state.

Further, while in the above embodiment the second region AR2 of the touch panel 10 is used for the JOG mode operations, there is not need of defining a JOG mode region. For example, the touch panel 10 may have absolute regions allotted for respective control modes as shown in FIG. 11.

In this instance, central seven regions ARs of the touch panel 10 are allotted as tape position control data input regions for the VTR such that the total length L logarithmically corresponds to the tape length for inputting desired position data. Right side four regions ARF of the touch panel 10 are allotted as regions for inputting reproducing speed data in the forward reproducing mode of the VTR, i.e., for inputting speed data for +1 time speed, +3 times speed, +10 times sped anad +50 times speed. The right side four regions ARB of the touch panel 10 are allotted as regions for inputting reproducing speed data in the reverse reproducing mode of the VTR, i.e., for inputting speed data for −1 time speed, −3 times speed, −10 times speed and −50 times speed.

Figure 4A:
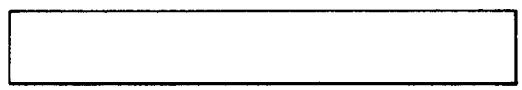
FIGS. 4A to 4G are views showing touch panel touch operation states reconized as respective patterns by a recognition unit.
Figure 4B:
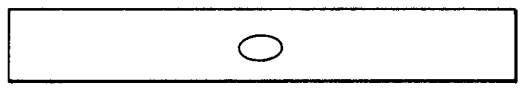
Figure 4C:
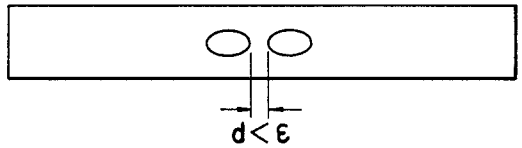
Figure 4D:
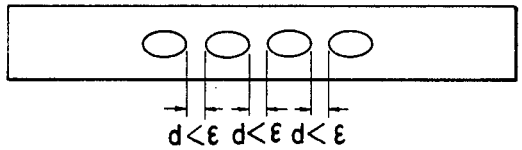

In this embodiment, when the touch operation state of the touch panel 10 is changed from the state shown in FIG. 4A where a finger is released from the panel to the state shown in FIGS. 4B,4C or 4D with at least one finger touching the panel, the change is detected as a change in the pattern data that is recognized by the recognition unit 40. Thus, the control data of the corresponding control operation mode represented by the touched region or regions of the touch panel 10 is provided from the judgement unit 70, so that the control operation of this control operation mode is brought about preferentially irrespective of any previous operation state of the VTR.

For example, when a central regions ARs of the touch panel 10 is touched, the tape position control of the VTR is effected according to the desired position data provided logarithmically to the touched region.

Figure 4E:
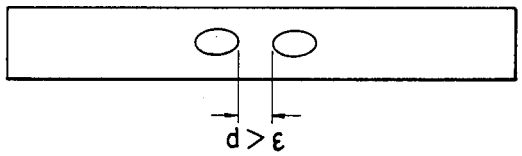
Figure 4F:
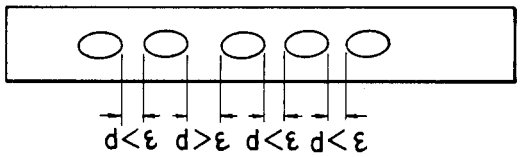
Figure 4G:
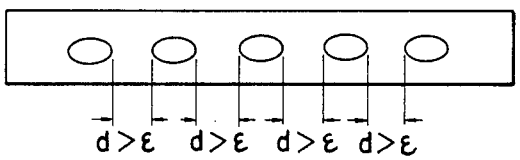

Further, when the state of FIGS. 4E, 4F and 4G is brought about by touching the touch panel 10 with a plurality of fingers while the panel has previously been not touched, the still mode of the VTR is set.

Further, when all the fingers are vertically released from the touch panel 10 substantially simultaneously, the previous operation of the VTR is maintained.

Further, when one of the fingers touching the touch panel 10 is moved along the panel either to the right or to the left, the so-called JOG mode operation of the VTR is brought about in correspondence to the movement of the finger irrespective of the absolute divisions of the touch panel 10.

Further, it is possible to use an annular touch panel 10 to provide for a sense of operation similar to that of a dial as shown in FIG. 12.

What is claimed is:

1. Signal reproduction apparatus for reproducing one of a video signal and an audio signal from a recording medium, comprising:
   panel means having a plurality of detection regions;
   touch detection means for detecting a touched state of each of said detection regions and producing detectio output data in response thereto;
   first memory means for temporarily storing said detection output data from said touch detection means;
   recognition means for recognizing composite touched states of said panel means as respective patterns in response to detection output data read out from said first memory means and producing pattern data corresponding to the recognized patterns;
   second memory means for temporarily storing said pattern data obtained from said recognition means;
   data comparison means for comparing first pattern data corresponding to the pattern recognized from a prevailing composite touched state and obtained from said recognition means with second pattern data corresponding to the pattern recognized from a preceding composite touched state and obtained from said second memory means and detecting a change between said first and second pattern data, said data comparison means producing comparison output data corresponding to the detected change in response thereto;
   control data generating means for providing control data according to said comparison output data obtained from said data comparison means;
   data reading means for reading the one signal from said recording medium;
   drive means for producing relative movement between said data reading means and said recording medium at respective relative speeds; and
   drive control means for controlling the relative speeds of said data reading means and said recording medium in response to said control data so as to reproduce the one signal from said recording medium at a corresponding speed.

2. The signal reproduction apparatus according to claim 1, wherein said touch detection means includes scanning means for detecting the touched state of each of said detection regions through scanning thereof, thereby detecting the composite touched state of said panel means at predetermined intervals.

3. The signal reproduction apparatus according to claim 2, wherein said panel means includes pulse generating means generating pulses at said predetermined intervals, a plurality of detection electrodes arranged in a row and spaced apart by a predetermined distance and connected to said pulse generating means, a plurality of grounding electrodes arranged alternately with said detection electrodes, and an insulating layer provided on said detection electrodes and said grounding electrodes so that when a portion of said insulating layer overlying a detection electrode and an adjacent grounding electrode is touched by a person, a capacitance between the detection electrode and the grounding electrode under the touched portion is changed, the change in the capacitance being detected by said touch detection means in response to said pulses.

4. The signal reproduction apparatus according to claim 2, wherein said tape drive control means causes said selected signal to be reproduced at a speed corresponding to a distance between a first position at which said touch detection means detects that said panel means is touched at one time and a second position at which said touch detection means detects that said panel means is touched a predetermined period of time afterwards, said signal being reproduced in a forward or reverse direction corresponding to a direction of movement from said first position to said second position.

5. The signal reproduction apparatus according to claim 2, wherein when the prevailing composite touched state includes a prevailing touched position at which said touch detection means detects that said panel means is touched which is increased in a direction with respect to a previous touched position a predetermined period of time before, the selected signal is reproduced at a speed corresponding to the interval of increase between the prevailing and previous touched positions and in a forward or reverse direction corresponding to the direction of increase to said prevailing touched position.

6. The signal reproduction apparatus according to claim 1, wherein said panel means has an annular shape to provide for touch operation in a sense similar to that of a dial.

7. A video signal reproduction apparatus for reproducing a video signal from a magnetic tape, comprising:
   panel means having a plurality of detection regions;
   scanning means for detecting a touched state of each of said detection regions through scanning thereof at predetermined times and providing detection output data indicative of a composite touched state of said panel means;
   first memory means for storing said detection output data obtained from said scanning means for each predetermined time;
   recognition means for recognizing composite touched states of said panel means as respective patterns in response to detection output data read out from said first memory means and producing pattern data corresponding to the recognized patterns;
   second memory means for temporarily storing said pattern data obtained from said recognition means;
   data comparison means for comparing first pattern data obtained from said recognition means at one time with second pattern data obtained at an instant a predetermined period of time before and read out from said second memory means to produce comparison output data corresponding to a detected change between said first and second pattern data;
   control data generating means for providing preset control data according to said comparison output data obtained from said data comparison means;
   signal reproducing means; and
   drive means for obtaining a reproduced image signal at a selected speed by driving said magnetic tape at a speed corresponding to said control data relative to said signal reproducing means.

* * * * *